(12) United States Patent
Murarka et al.

(10) Patent No.: US 9,959,007 B2
(45) Date of Patent: May 1, 2018

(54) CARD-STACK INTERFACE

(71) Applicant: Facebook, Inc., Menlo Park, CA (US)

(72) Inventors: Neel Ishwar Murarka, Menlo Park, CA (US); Brandon Marshall Walkin, San Francisco, CA (US); William Joseph Flynn, III, San Francisco, CA (US); Michael Matas, San Francisco, CA (US); Francis Luu, San Francisco, CA (US); Richard Kenneth Zadoronzy, San Bruno, CA (US)

(73) Assignee: Facebook, Inc., Menlo Park, CA (US)

( * ) Notice: Subject to any disclaimer, the term of this patent is extended or adjusted under 35 U.S.C. 154(b) by 185 days.

(21) Appl. No.: 13/705,384

(22) Filed: Dec. 5, 2012

(65) Prior Publication Data

US 2014/0152541 A1   Jun. 5, 2014

(51) Int. Cl.
*G06F 3/0481* (2013.01)
*G06Q 50/00* (2012.01)
*G06F 3/0488* (2013.01)
*G06Q 10/10* (2012.01)

(52) U.S. Cl.
CPC .......... *G06F 3/0481* (2013.01); *G06F 3/0488* (2013.01); *G06Q 10/101* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 2009/0271731 A1* | 10/2009 | Lin et al. | 715/776 |
| 2010/0095240 A1* | 4/2010 | Shiplacoff et al. | 715/784 |
| 2010/0211872 A1* | 8/2010 | Rolston et al. | 715/702 |
| 2011/0016417 A1* | 1/2011 | Shiplacoff et al. | 715/768 |
| 2012/0290449 A1* | 11/2012 | Mullen et al. | 705/27.2 |
| 2013/0047115 A1* | 2/2013 | Migos et al. | 715/776 |
| 2013/0063339 A1* | 3/2013 | Maier | 345/156 |
| 2014/0059496 A1* | 2/2014 | White et al. | 715/841 |

* cited by examiner

*Primary Examiner* — David D Davis
(74) *Attorney, Agent, or Firm* — Baker Botts L.L.P.

(57) ABSTRACT

In one embodiment, a method includes displaying one of a number of graphical user interfaces (GUIs) of one or more applications as a card on top of a card stack. One or more of the cards in the card stack corresponds to a GUI of a home screen of the computing device. Each of one or more of the cards in the card stack corresponds to one of the GUIs of an application. The application controls presentation of their GUIs as cards in the card stack. The method also includes receiving user input to display another one of the GUIs as the card on top of the card stack; and, in response to the user input, displaying the other one of the GUIs as the card on top of the card stack.

20 Claims, 5 Drawing Sheets

CARD-STACK INTERFACE

TECHNICAL FIELD

This disclosure generally relates to mobile devices.

BACKGROUND

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, the card stack may be visual model indicating which applications or content of an application are being executed on a computing device. The card stack may have a card that is analogous to the launcher that displays all applications installed on the computing device. In particular embodiments, the user may access the card corresponding to the launcher by performing a gesture, such as for example swiping down from top, or pressing the "home" button of the computing device. Applications executed on the computing device or content of the applications (e.g. profile page of a user on a social network or tab of a web browser) may be displayed as a card stacked above the launcher card. In particular embodiments, the cards of the card stack may be ordered chronologically with the most recently executed applications being higher in the card stack. Each card may be accessed by swiping up on an exposed edge of the card or pulling down on the exposed edge of card depending on how the cards are stacked on the screen. In particular embodiments, each card may display a screenshot of the application or content. In particular embodiments, the display of content as one or more cards may be controlled by the application.

DESCRIPTION OF EXAMPLE EMBODIMENTS

Figure 1:
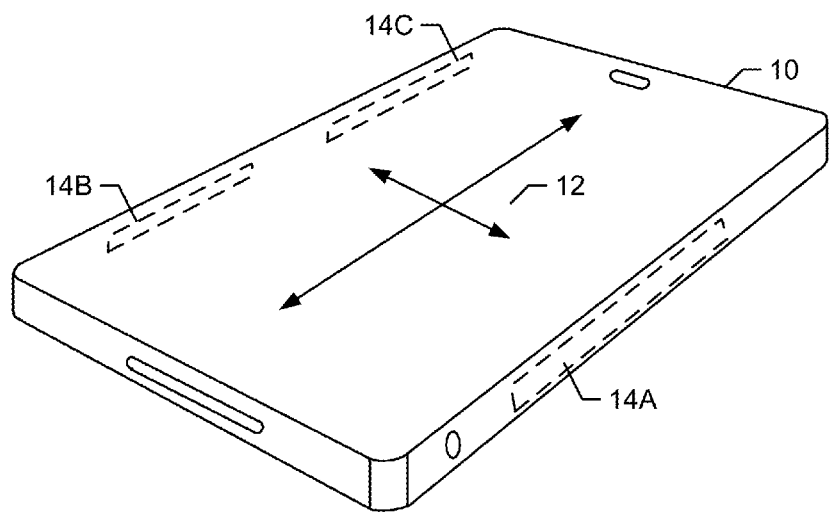
FIG. 1 illustrates an example mobile device.

FIG. 1 illustrates an example mobile device. In particular embodiments, the client system may be a mobile device 10 as described above. This disclosure contemplates mobile device 10 taking any suitable physical form. In particular embodiments, mobile device 10 may be a computing system as described below. As example and not by way of limitation, mobile device 10 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile device 10 may have a touch sensor 12 as an input component. In the example of FIG. 1, touch sensor 12 is incorporated on a front surface of mobile device 10. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 1, one or more antennae 14A-B may be incorporated into one or more sides of mobile device 10. Antennae 14A-B are components that convert electric current into radio waves, and vice versa. During transmission of signals, a transmitter applies an oscillating radio frequency (RF) electric current to terminals of antenna 14A-B, and antenna 14A-B radiates the energy of the applied the current as electromagnetic (EM) waves. During reception of signals, antennae 14A-B convert the power of an incoming EM wave into a voltage at the terminals of antennae 14A-B. The voltage may be transmitted to a receiver for amplification.

Mobile device many include a communication component coupled to antennae 14A-B for communicating with an Ethernet or other wire-based network or a wireless NIC (WNIC), wireless adapter for communicating with a wireless network, such as for example a WI-FI network or modem for communicating with a cellular network, such third generation mobile telecommunications (3G), or Long Term Evolution (LTE) network. This disclosure contemplates any suitable network and any suitable communication component 20 for it. As an example and not by way of limitation, mobile device 10 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, mobile device 10 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Mobile device 10 may include any suitable communication component for any of these networks, where appropriate.

In particular embodiments, a card-stack interface may be a visual model of the home screen and one or more applications or any content associated with an application executed on mobile device 10, as described below. As an example and not by way of limitation, a home screen may be an application that may set one or more settings of mobile device 10, such as for example, the background image of mobile device 10, or associate particular functions to particular applications installed on mobile device 10, such as for example, the default web browser. In particular embodiments, mobile device 10 may use the card-stack interface to navigate between a home screen and applications or content of the application, as described below. As an example and not by way of limitation, a card of the card-stack interface may correspond to the graphical user interface (GUI) of the home screen and may be provided for display on mobile device 10 in response to a user pressing or actuating the "home" button, after using an application executed on mobile device 10, or after completing a phone call on mobile device 10. As described below, a card corresponding to an application or content of an application may be added to the card stack in response to "launching" or executing the application. In particular embodiments, the user of mobile device 10 may navigate between applications and content of executed applications through the cards of the card-stack interface, as described below.

Figure 2:
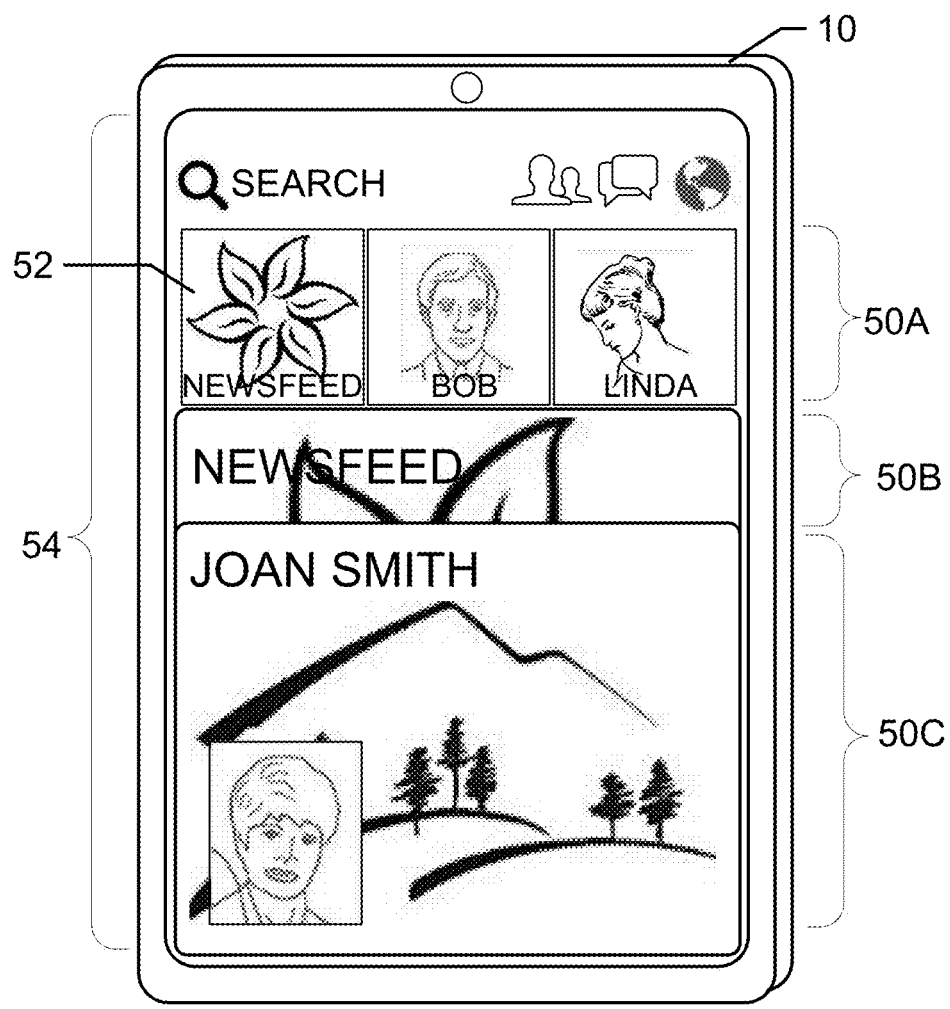
FIG. 2 illustrates an example wireframe for an example card-stack interface.

FIG. 2 an example wireframe of an example card-stack interface. One or more "cards" 50A-C of a card-stack interface 50A-C may be displayed in display area 54 of mobile device 10. In the example of FIG. 2, each card 50A-C corresponds to a GUI of an application or content associated with an application executed on mobile device 10. In particular embodiments, card 50B of card-stack interface may correspond to the GUI of an application executed by mobile device 10. As described above, card 50A in card-stack interface 50A-C may correspond to the GUI of a home screen of mobile device 10. As an example and not by way of limitation, card 50A may correspond to the GUI of the home screen and may function as an application launcher of mobile device 10. As an example and not by way of limitation, card 50A may provided for display in response to actuating the "home" button or detecting a pre-determined touch input, such as for example, performing a downward swipe from substantially the top of display area 54. In particular embodiments, card 50A corresponding to the GUI of the home screen may include one or more interactive elements 52 corresponding to one or more applications or content installed on mobile device 10. In particular embodiments, card 50A may be a visual representation of a linear transversal of interactive elements 52. As an example and not by way of limitation, interactive elements 52 may ordered from left to right in accordance with the application or content was launched. As another example, tapping an interactive element 52 may generate a card 50B-C associated with the interactive element 52.

One or more cards 50A-C that correspond to an application or content of an application being executed on mobile device 10 may be displayed as card stack interface 50A-C. In the example of FIG. 2, card 50B corresponds to the GUI of an application being executed on mobile device 10 and card 50C corresponds to the GUI of content associated with the application being executed on mobile device 10. In particular embodiments, card 50B may be provided for display in response to launching the application on mobile device 10. In particular embodiments, one or more applications on mobile device 10 may control presentation of their GUIs as cards 50C in card stack interface 50A-C. Card 50C may be provided for display based at least in part on the settings of the application being executed. As an example and not by way of limitation, card 50B may correspond to the GUI of a social-networking system or web browser and content card 50C may correspond to a profile page of a user on the social-networking system or a tab of the web browser, respectively. The social-networking system or web browser may configure the card-stack interface to automatically display the GUI of particular content in one or more separate cards 50C. In particular embodiments, card 50C associated with content of an application may be provided for display in response to the user performing a pre-determined touch input, such as for example, a swipe touch-gesture or tapping a pre-determined location of the GUI of the application. In particular embodiments, the GUI of each card 50A-C may be depicted as a screenshot of the associated application or content of the associated application. Although this disclosure illustrates and describes a particular configuration of cards with particular characteristics and content, this disclosure contemplates any suitable configuration of cards with any suitable characteristics, such as for example, dimensions or appearance, and content. Moreover, this disclosure contemplates a card-stack interface implemented on any suitable computing device, such as for example, a personal computer, a tablet computer, or a smartphone.

In the example of FIG. 2, card 50B corresponding to the GUI of a launched application and a card 50C corresponding to the GUI of content associated with a launched application may overlay card 50A associated with the GUI of the home screen of mobile device 10. As described above, opening a GUI of an application on mobile device 10 may initiate adding card 50C corresponding to the GUI to card stack interface 50A-C. In particular embodiments, card 50C may be placed on top of card-stack interface 50A-C when the application or content associated with card 50C is launched. In particular embodiments, an order of the cards in card stack 50A-C may be determined based at least in part on an order in which the GUIs corresponding to cards 50B-C were opened. As an example and not by way of limitation, cards 50B-C may be displayed in chronological order based on when the application was launched or the content associated with the application was separated or "popped out" from the application. As an example and not by way of limitation, application cards 50B and content cards 50C may be provided for display such that the most recently executed applications or content associated with an application are displayed higher up in the card stack.

In particular embodiments, the user of mobile device 10 may navigate through cards 50A-C using touch input detected by touch sensor of mobile device 10. As an example and not by way of limitation, the user may navigate between cards 50A-C by swiping upward or pulling down an exposed edge of card 50A-C depending on how cards 50A-C are stacked on the display of mobile device 10. Although this disclosure describes navigating through the cards using particular touch gestures, this disclosure contemplates navigation of the cards through any suitable user input, such as for example, actuating a button. In particular embodiments, the card-stack interface of mobile device 10 may detect a user input to display a card, such as for example 50B, as the card on top of card-stack interface 50A-C and the card-stack interface may display the card on top of card-stack interface 50A-C in response to the user input. As an example and not by way of limitation, card-stack interface 50A-C may order of cards 50A-C in card-stack interface 50A-C by displaying cards 50B-C corresponding to more recently opened GUIs higher in card-stack interface 50A-C and cards 50B-C corresponding to less recently opened GUIs lower in the card-stack interface 50A-C. In particular embodiments, cards 50A-C of card-stack interface 50A-C may be re-ordered in response to detecting powering down the display of mobile device 10, a change of geo-location of mobile device 10, a pre-determined movement detected through one or more sensors of mobile device 10, one or more pre-determined touch gestures detected through the touch sensor of mobile device 10, a change of network condition (e.g. loss of connectivity), a request for higher priority for one or more cards 50A-C received through an application programming interface (API), or any combination thereof. Although this disclosure describes re-ordering one or more cards of the card-stack interface based on particular criteria, this disclosure contemplates re-ordering of the cards of the card-stack interface based on any suitable criteria.

In particular embodiments, the user may interact with the application or content associated with card 50C on top of card-stack interface 50A-C. In the example of FIG. 2, card 50C may be a GUI corresponding to a profile page of a particular user on a social-networking system and the user of mobile device 10 may interact with the profile page through card 50C corresponding to the GUI of the profile page. The user may then move card 50A corresponding to the GUI of the home screen of mobile device 10 to the top of card-stack interface 50A-C and launch an application associated with one of interactive elements 52, such as for example, a newsfeed. After launching the newsfeed, the user may move card 50B associated with a social-networking system to the top of card-stack interface 50A-C and interact, for example, commenting on a status update of another user, with the social-networking system through card 50B corresponding to the GUI of the social-networking system.

Figure 3:
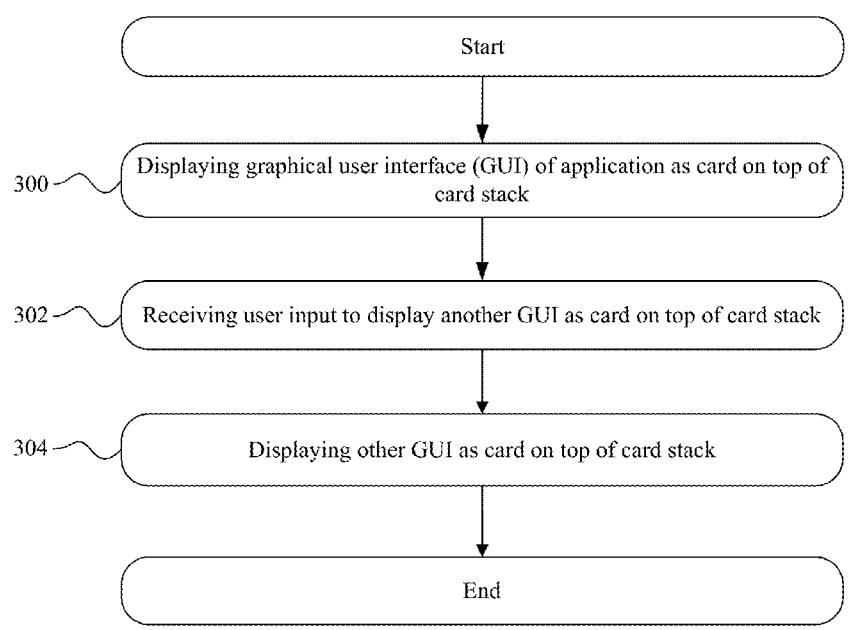
FIG. 3 illustrates an example method for a card-stack interface on a computing device.

FIG. 3 illustrates an example method for a card-stack interface on a computing device. The method may start at step 300, where the computing device displays a GUI of an application as a card on top of a card stack. In particular embodiments, one or more of the cards in the card stack may correspond to a GUI of a home screen of the computing device. Moreover, each card in the card stack may correspond to a GUI of one of the applications. In particular embodiments, the application may control presentation of their GUIs as cards in the card stack. At step 302 the computing device selects receives user input to display another GUI as the card on top of the card stack. At step 304, the computing device displays the other GUI as the card on top of the card stack in response to the user input, at which point the method may end. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components carrying out particular steps of the method of FIG. 3, this disclosure contemplates any suitable combination of any suitable components carrying out any suitable steps of the method of FIG. 3.

Figure 4:
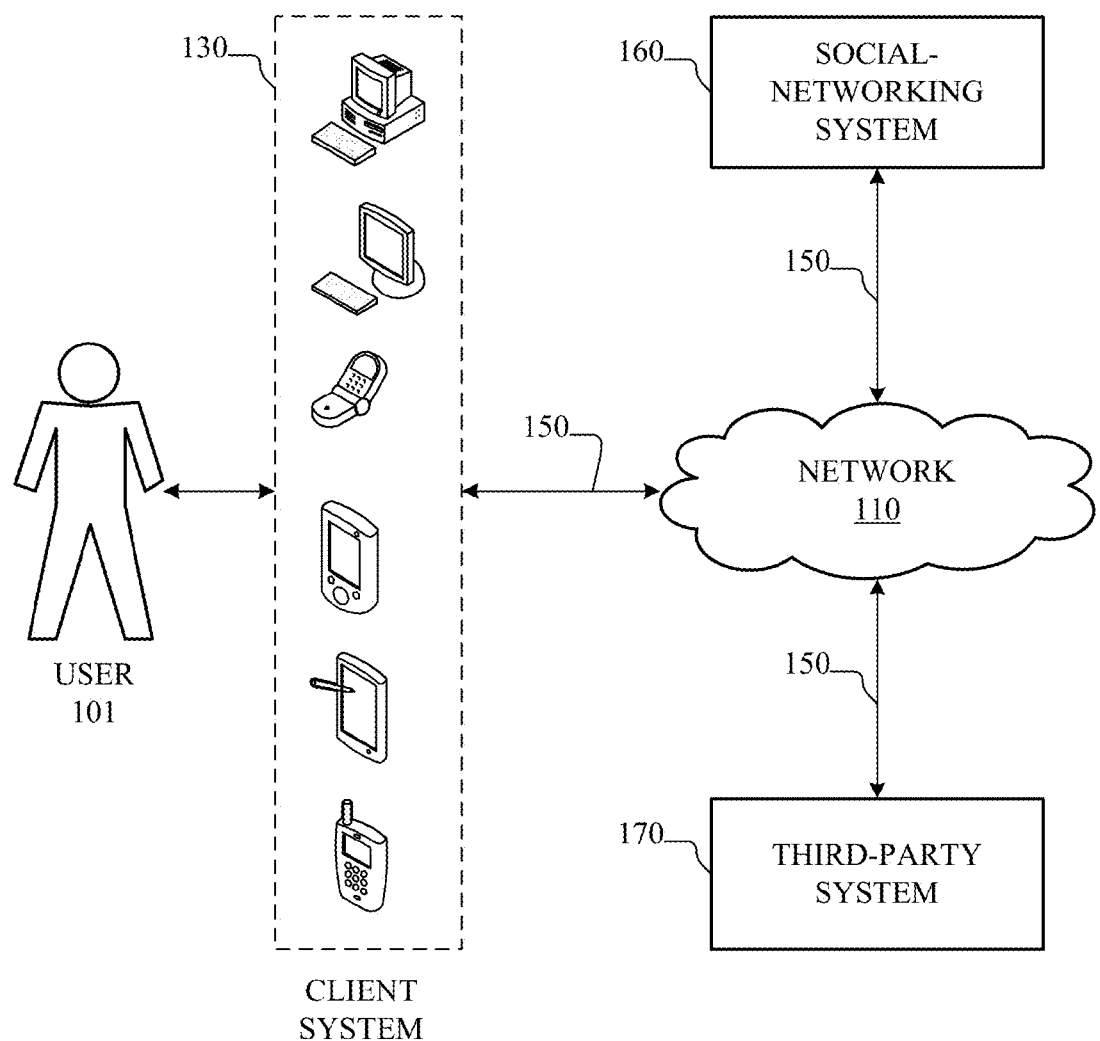
FIG. 4 illustrates an example network environment associated with a social-networking system.

FIG. 4 illustrates an example network environment 100 associated with a social-networking system. Network environment 100 includes a user 101, a client system 130, a social-networking system 160, and a third-party system 170 connected to each other by a network 110. Although FIG. 4 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 4 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g. an enterprise, business, or third-party application), or a group (e.g. of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g. third-party systems 170), such as, for example, by setting appropriate privacy settings. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 5:
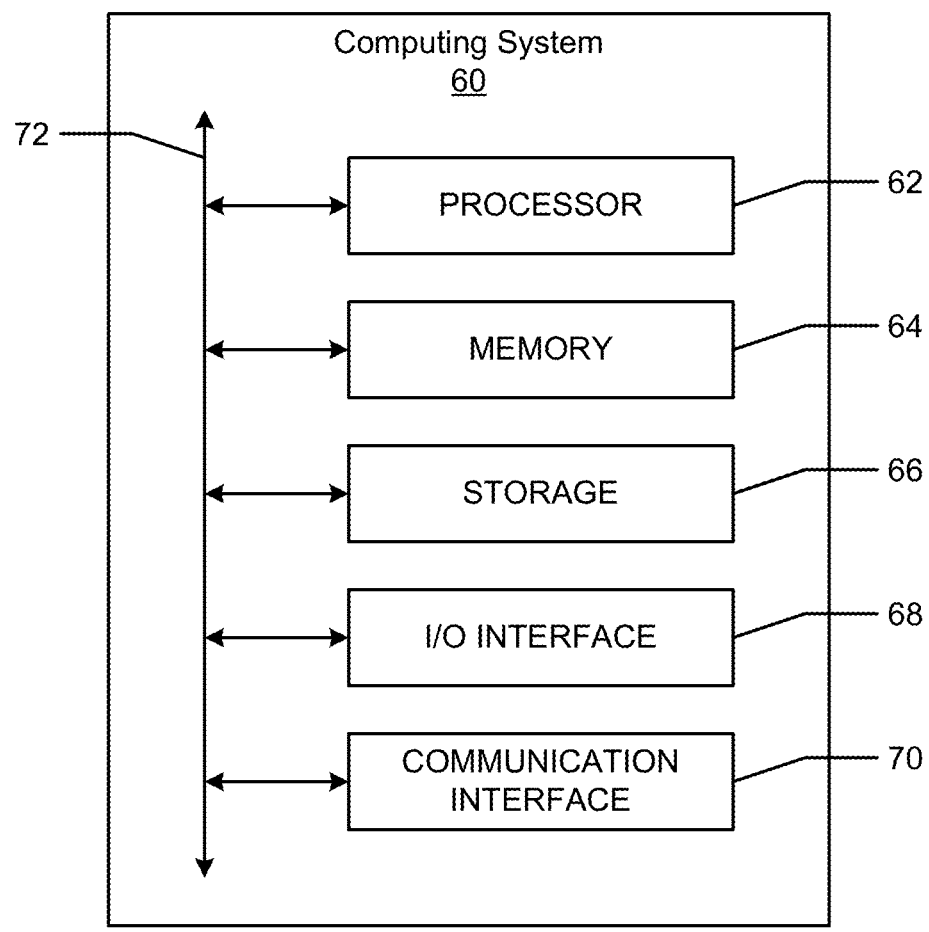
FIG. 5 illustrates an example computing system.

FIG. 5 illustrates example computing system. In particular embodiments, one or more computer systems 60 perform one or more steps of one or more methods described or illustrated herein. In particular embodiments, one or more computer systems 60 provide functionality described or illustrated herein. In particular embodiments, software running on one or more computer systems 60 performs one or more steps of one or more methods described or illustrated herein or provides functionality described or illustrated herein. Particular embodiments include one or more portions of one or more computer systems 60. Herein, reference to a computer system may encompass a computing device, where appropriate. Moreover, reference to a computer system may encompass one or more computer systems, where appropriate.

This disclosure contemplates any suitable number of computer systems 60. This disclosure contemplates computer system 60 taking any suitable physical form. As example and not by way of limitation, computer system 60 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 60 may include one or more computer systems 60; be unitary or distributed; span multiple locations; span multiple machines; span multiple data centers; or reside in a cloud, which may include one or more cloud components in one or more networks. Where appropriate, one or more computer systems 60 may perform without substantial spatial or temporal limitation one or more steps of one or more methods described or illustrated herein. As an example and not by way of limitation, one or more computer systems 60 may perform in real time or in batch mode one or more steps of one or more methods described or illustrated herein. One or more computer systems 60 may perform at different times or at different locations one or more steps of one or more methods described or illustrated herein, where appropriate.

In particular embodiments, computer system 60 includes a processor 62, memory 64, storage 66, an input/output (I/O) interface 68, a communication interface 70, and a bus 72. Although this disclosure describes and illustrates a particular computer system having a particular number of particular components in a particular arrangement, this disclosure contemplates any suitable computer system having any suitable number of any suitable components in any suitable arrangement.

In particular embodiments, processor 62 includes hardware for executing instructions, such as those making up a computer program. As an example and not by way of limitation, to execute instructions, processor 62 may retrieve (or fetch) the instructions from an internal register, an internal cache, memory 64, or storage 66; decode and execute them; and then write one or more results to an internal register, an internal cache, memory 64, or storage 66. In particular embodiments, processor 62 may include one or more internal caches for data, instructions, or addresses. This disclosure contemplates processor 62 including any suitable number of any suitable internal caches, where appropriate. As an example and not by way of limitation, processor 62 may include one or more instruction caches, one or more data caches, and one or more translation lookaside buffers (TLBs). Instructions in the instruction caches may be copies of instructions in memory 64 or storage 66, and the instruction caches may speed up retrieval of those instructions by processor 62. Data in the data caches may be copies of data in memory 64 or storage 66 for instructions executing at processor 62 to operate on; the results of previous instructions executed at processor 62 for access by subsequent instructions executing at processor 62 or for writing to memory 64 or storage 66; or other suitable data. The data caches may speed up read or write operations by processor 62. The TLBs may speed up virtual-address translation for processor 62. In particular embodiments, processor 62 may include one or more internal registers for data, instructions, or addresses. This disclosure contemplates processor 62 including any suitable number of any suitable internal registers, where appropriate. Where appropriate, processor 62 may include one or more arithmetic logic units (ALUs); be a multi-core processor; or include one or more processors 62. Although this disclosure describes and illustrates a particular processor, this disclosure contemplates any suitable processor.

In particular embodiments, memory 64 includes main memory for storing instructions for processor 62 to execute or data for processor 62 to operate on. As an example and not by way of limitation, computer system 60 may load instructions from storage 66 or another source (such as, for example, another computer system 60) to memory 64. Processor 62 may then load the instructions from memory 64 to an internal register or internal cache. To execute the instructions, processor 62 may retrieve the instructions from the internal register or internal cache and decode them. During or after execution of the instructions, processor 62 may write one or more results (which may be intermediate or final results) to the internal register or internal cache. Processor 62 may then write one or more of those results to memory 64. In particular embodiments, processor 62 executes only instructions in one or more internal registers or internal caches or in memory 64 (as opposed to storage 66 or elsewhere) and operates only on data in one or more internal registers or internal caches or in memory 64 (as opposed to storage 66 or elsewhere). One or more memory buses (which may each include an address bus and a data bus) may couple processor 62 to memory 64. Bus 72 may include one or more memory buses, as described below. In particular embodiments, one or more memory management units (MMUs) reside between processor 62 and memory 64 and facilitate accesses to memory 64 requested by processor 62. In particular embodiments, memory 64 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 64 may include one or more memories 64, where appropriate. Although this disclosure describes and illustrates particular memory, this disclosure contemplates any suitable memory.

In particular embodiments, storage 66 includes mass storage for data or instructions. As an example and not by way of limitation, storage 66 may include a hard disk drive (HDD), a floppy disk drive, flash memory, an optical disc, a magneto-optical disc, magnetic tape, or a Universal Serial Bus (USB) drive or a combination of two or more of these. Storage 66 may include removable or non-removable (or fixed) media, where appropriate. Storage 66 may be internal or external to computer system 60, where appropriate. In particular embodiments, storage 66 is non-volatile, solid-state memory. In particular embodiments, storage 66 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 66 taking any suitable physical form. Storage 66 may include one or more storage control units facilitating communication between processor 62 and storage 66, where appropriate. Where appropriate, storage 66 may include one or more storages 66. Although this disclosure describes and illustrates particular storage, this disclosure contemplates any suitable storage.

In particular embodiments, I/O interface 68 includes hardware, software, or both providing one or more interfaces for communication between computer system 60 and one or more I/O devices. Computer system 60 may include one or more of these I/O devices, where appropriate. One or more of these I/O devices may enable communication between a person and computer system 60. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 68 for them. Where appropriate, I/O interface 68 may include one or more device or software drivers enabling processor 62 to drive one or more of these I/O devices. I/O interface 68 may include one or more I/O interfaces 68, where appropriate. Although this disclosure describes and illustrates a particular I/O interface, this disclosure contemplates any suitable I/O interface.

In particular embodiments, communication interface 70 includes hardware, software, or both providing one or more interfaces for communication (such as for example, packet-based communication) between computer system 60 and one or more other computer systems 60 or one or more networks. As an example and not by way of limitation, communication interface 70 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 70 for it. As an example and not by way of limitation, computer system 60 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 60 may communicate with a wireless PAN (WPAN) (such as for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 60 may include any suitable communication interface 70 for any of these networks, where appropriate. Communication interface 70 may include one or more communication interfaces 70, where appropriate. Although this disclosure describes and illustrates a particular communication interface, this disclosure contemplates any suitable communication interface.

In particular embodiments, bus 72 includes hardware, software, or both coupling components of computer system 60 to each other. As an example and not by way of limitation, bus 72 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 72 may include one or more buses 72, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by a computing device, displaying a graphical user interface (GUI) of a home screen of the computing device as a first card of a plurality of cards in a card stack, the GUI of the home screen including first and second interactive elements corresponding to respective first and second applications installed on the computing device, one or more of the cards each corresponding to a GUI of one of the applications, each of the applications controlling presentation of its GUI as a card in the card stack;

by the computing device, in response to a first touch input on the first interactive element, displaying the card presenting the GUI for the first application on top of the card stack;

by the computing device, in response to a second touch input, displaying the card presenting the GUI for the second application on top of the card stack; and by the computing device, in response to a user performing a pre-determined touch input at a pre-determined location of the second application GUI, displaying, on top of the card stack, a content card associated with content of the second application.

2. The method of claim 1, wherein the home screen is an application launcher from which each of the applications can be launched.

3. The method of claim 1, wherein a plurality of the cards correspond to a plurality of GUIs of a single one of the applications.

4. The method of claim 3, wherein:
the single one of the applications is a web browser; and
the GUIs of the single one of the applications are tabs of the web browser.

5. The method of claim 3, wherein:
the single one of the applications is a social-networking application of a social-networking system; and
the GUIs of the single one of the applications are profile pages of users of the social-networking system.

6. The method of claim 1, wherein opening a GUI of an application on the computing device causes a card corresponding to the GUI to be added to the card stack.

7. The method of claim 1, wherein re-ordering one or more of the cards of the card stack is in response to detecting powering down a display of the computing device, a change of geo-location of the computing device, a change of a network condition of the computing device, or a request for higher priority for one or more of the cards received through an application programming interface (API), or any combination thereof.

8. The method of claim 1, wherein an order of the cards in the card stack is determined based on an order in which the GUIs corresponding to them were opened.

9. The method of claim 8, wherein the order of the cards in the card stack comprises more recently opened GUIs being higher in the card stack and less recently opened GUIs being lower in the card stack.

10. The method of claim 1, wherein the first touch input is a swipe touch-gesture.

11. One or more computer-readable non-transitory storage media embodying logic configured when executed to:
display a graphical user interface (GUI) of a home screen of the computing device as a first card of a plurality of cards in a card stack, the GUI of the home screen including first and second interactive elements corresponding to respective first and second applications installed on the computing device, one or more of the cards each corresponding to a GUI of one of the applications, each of the applications controlling presentation of its GUI as a card in the card stack;
in response to a first touch input on the first interactive element, display the card presenting the GUI for the first application on top of the card stack;
in response to a second touch input, display the card presenting the GUI for the second application on top of the card stack; and in response to a user performing a pre-determined touch input at a pre-determined location of the second application GUI, display, on top of the card stack, a content card associated with content of the second application.

12. The media of claim 11, wherein the home screen is an application launcher from which each of the applications can be launched.

13. The media of claim 11, wherein a plurality of the cards correspond to a plurality of GUIs of a single one of the applications.

14. The media of claim 13, wherein:
the single one of the applications is a web browser; and
the GUIs of the single one of the applications are tabs of the web browser.

15. The media of claim 13, wherein:
the single one of the applications is a social-networking application of a social-networking system; and
the GUIs of the single one of the applications are profile pages of users of the social-networking system.

16. The media of claim 11, wherein the logic is further configured to cause a card corresponding to a GUI to be added to the card stack in response to opening a GUI of an application on the computing device.

17. The media of claim 11, wherein the logic is further configured to re-order one or more of the cards of the card stack in response to detecting powering down a display of the computing device, a change of geo-location of the computing device, a change of a network condition of the computing device, or a request for higher priority for one or more of the cards received through an application programming interface (API), or any combination thereof.

18. The media of claim 11, wherein an order of the cards in the card stack is determined based on an order in which the GUIs corresponding to them were opened.

19. The media of claim 18, wherein the logic is further configured to:
place more recently opened GUIs higher in the card stack; and
place less recently opened GUIs lower in the card stack.

20. A system comprising:
one or more processors; and
a memory coupled to the processors comprising instructions executable by the processors, the processors being operable when executing the instructions to:
display a graphical user interface (GUI) of a home screen of the computing device as a first card of a plurality of cards in a card stack, the GUI of the home screen including first and second interactive elements corresponding to respective first and second applications installed on the computing device, one or more of the cards each corresponding to a GUI of one of the applications, each of the applications controlling presentation of its GUI as a card in the card stack;
in response to a first touch input on the first interactive element, display the card presenting the GUI for the first application on top of the card stack;
in response to a second touch input, display the card presenting the GUI for the second application as the card on top of the card stack; and
in response to a user performing a pre-determined touch input at a pre-determined location of the second application GUI, display, on top of the card stack, a content card associated with content of the second application.

* * * * *